Aug. 4, 1931.    H. B. REX    1,817,765
RECTIFIED CURRENT TELEMETERING SYSTEM
Filed Nov. 16, 1929

Inventor:
Harold B. Rex,
by Charles V. Tullar
His Attorney.

Patented Aug. 4, 1931

1,817,765

UNITED STATES PATENT OFFICE

HAROLD B. REX, OF LYNN, MASSACHUSETTS, ASSIGNOR TO GENERAL ELECTRIC COMPANY, A CORPORATION OF NEW YORK

RECTIFIED CURRENT TELEMETERING SYSTEM

Application filed November 16, 1929. Serial No. 407,771.

My invention relates to telemetering systems and in particular to an improved telemetering system for alternating current measurements wherein the alternating measurement current is rectified before being transmitted and wherein such rectified current is measured at the receiving end of the system by direct current instruments. The invention relates more particularly to the proper protection of the system and to facilities for the accurate transmission over existing channels such for example as telephone lines without interference.

The system is simple and consists essentially of an instrument transformer, a rectifier, a transmission channel, and a direct current measuring instrument. Where measurements of both volts and amperes of a circuit are transmitted a direct current wattmeter at the receiving end may also be used to obtain a measurement of the voltamperes of the alternating circuit being metered. Transmission by direct current instead of alternating current eliminates all trouble due to pilot wire inductance and capacitance and when such a system is provided with the improvements hereinafter described it gives very satisfactory results.

The features of my invention which are believed to be novel and patentable will be pointed out in the claims appended hereto. For a better understanding of the invention reference is made in the following description to the accompanying drawings which shows in Fig. 1 a system for the transmission of volts, amperes and voltamperes in accordance with my invention; and Fig. 2 illustrates a glow tube having a protective feature for use in such a system as is represented in Fig. 1.

Figure 1:
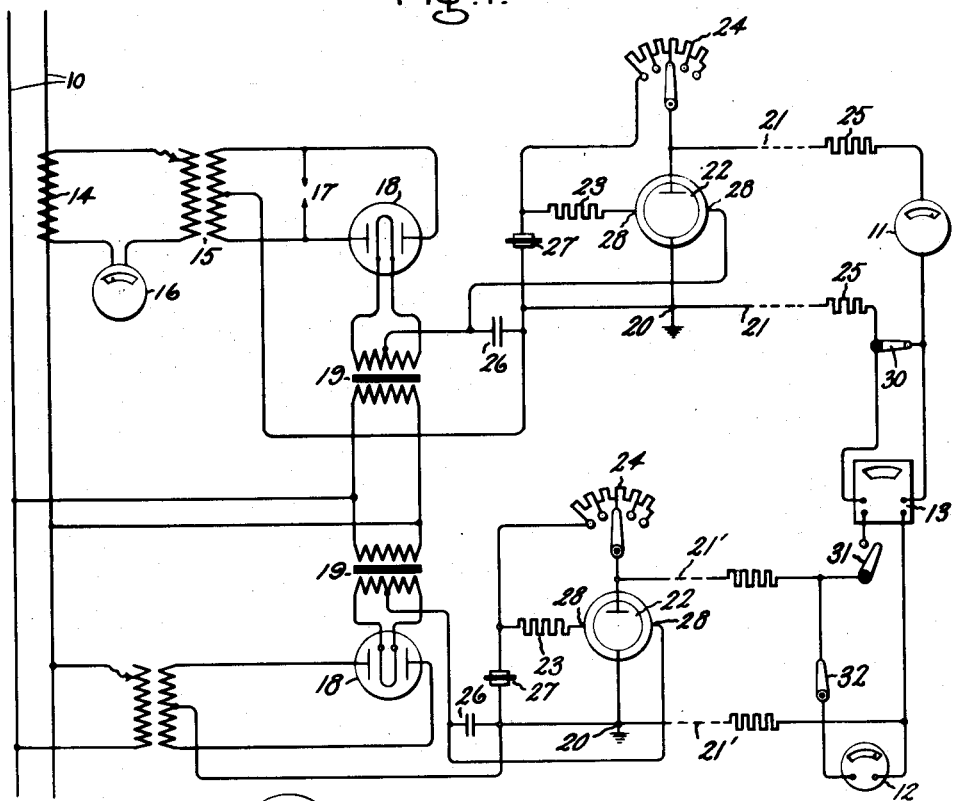
Figure 2:
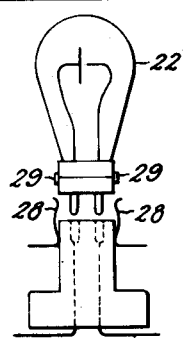

Referring to Fig. 1, 10 represents an alternating current circuit of which it is desired to obtain a measurement of current, voltage and voltamperes at a distant point or points indicated by the direct current instruments 11, 12 and 13 respectively. Two rectifying and transmission channels are shown, the upper channel being for current and the lower channel for voltage. The upper or current rectifying and transmitting channel will now be described. At 14 is an ordinary instrument current transformer having its primary connected in the alternating current circuit 10 and its secondary connected to the primary of a rectifying transformer 15. An alternating current device such as an ammeter 16 may be included in this circuit for use at the transmitting station and is represented to show that the usual alternating current metering and relay devices may be energized from the same transformers that supply the rectifying apparatus leading to the telemetering system. The secondary winding of the rectifier transformer is tapped at the middle in order to obtain full wave rectification. A protective spark gap 17 is connected across the secondary of transformer 15 so that in case the secondary circuit becomes open circuited for any reason the gap will break down before a dangerously high voltage exists. The spark gap is a protective device and is normally inactive. The normal burden on the current transformer 14 need not exceed 10 voltamperes and in case the spark gap breaks down the burden is limited to about twice this amount so that there is very litle danger of overloading the transformer 14.

The full wave rectifier represented at 18 is preferably of the hot cathode mercury vapor type having its two anodes connected across the secondary of transformer 15. The filament cathode of the rectifier is excited from the secondary of a small transformer 19 energized from the alternating current circuit 10. In order to obtain long life the filament is preferably allowed to operate continuously since intermittent operation would shorten the life of the filament due to repeated heating and cooling. I do not confine myself to the use of any particular type of rectifier but the type here represented has been employed by me in the practicable use of my invention with satisfactory results, it being particularly suitable because of substantially constant internal resistance and because its characteristics relative to pick-up voltage, arc drop and break-down voltage are favorable to the use in question. The terminals of the rectified telemetering circuit are 100 the midpoints of the transformer secondaries 15 and 19.

The negative side of the direct current circuit which is preferably grounded at 20 is connected to one side of a transmitting circuit 21 which may be a telephone circuit. The positive side of the direct current circuit is connected through contacts on a high voltage protective device 22 which is preferably a glow tube, a protective resistance 23, a calibrating resistance 24, to the other wire of circuit 21. The resistances represented at 25 represent line resistance. Across the circuit at the transmitting end are connected a condenser 26, a film cutout 27 and the glow tube 22 as represented. The purpose of the condenser is to smooth out and filter the rectified current. I have found a 2-microfarad condenser satisfactory for this purpose.

The principal protection against high voltage on the transmission channel is the neon glow tube 22. If the voltage across 21 rises excessively it does not cause damage but the glow tube takes the current and causes the voltage to drop. The glow tube has such characteristics that it will not pass current at the low operating voltage of the system but if anything should happen that might cause the line voltage to rise to 125 volts for example the glow tube passes current and immediately drops the voltage to say 90 volts, thus preventing breaking down the insulation of the circuit.

As shown diagrammatically in Fig. 1 and in detail in Fig. 2, the positive wire goes through cooperating contacts 28 and 29 on the socket and base of the glow tube 22. This circuit is completed only when the glow tube is inserted in the socket and consequently only when it is connected across the line in its protective position. Consequently, if the glow tube is not in place no voltage can be applied to the transmission channel from the rectifier. This interlocking protective feature is applicable to telemetering systems generally. The potential film cut-out 27 serves as a secondary high voltage protection in case anything happens to the glow tube, while in place, which prevents its operation. In such a case the film cut-out breaks down and short circuits the whole apparatus until the glow tube and film cut-out are replaced. The protective resistor 23 limits the short circuit current in case the line 21 should become short circuited or in case the glow tube or film cut-out breaks down since the resistance is between these devices and the rectifier, and is particularly useful when a voltage reading is being transmitted.

The adjustable calibrating resistance 24 is used to make the circuit resistance equal to a given calibrated value. This element is also more important when a voltage indication is being transmitted since it will be evident that when current readings are being transmitted the current transformer 14 must maintain ampere turns in the secondary to balance the ampere turns in the primary and thus variation in line resistance will not seriously affect the calibration of the equipment when used for current readings.

The equipment at the transmitting end of the voltage rectifying and transmitting channed 21' shown in the lower portion of the figure is substantially the same except the current transformer 14 is omitted. The spark gap 17 is unnecessary and is omitted, the resistors 23 and 24 become more important for reasons previously pointed out. The combined resistance of the line, receiver, compensating resistance and protective resistance (of about 2500 ohms) may be in the neighborhood of 5000 ohms with satisfactory results. In case the line becomes short circuited the protective resistance 23 will thus limit the current to twice normal and prevent burning out of the rectifying transformer. The receiver instruments 11 and 12 are preferably standard indicating, integrating or recording direct current instruments calibrated in terms of the units being measured. Thus instrument 11 is calibrated in amperes and instrument 12 in volts of the alternating current circuit 10. The instrument at 13 is a suitable low hysteresis direct current wattmeter or watthour meter. By opening switch 30 and closing switch 31 the instrument 13 may be calibrated and used to read in voltamperes of the alternating circuit 10. Thus by this system we may read volts, amperes and voltamperes. Adjustment of the calibrating resistance 24 of the voltage equipment should be made when opening and closing switch 31 to compensate for the change in the resistance at the receiving end. Instead of this, I may provide a switch 32 leading to the instrument 12 so that when a voltampere reading is being taken, switch 32 may be opened and 31 closed, and when a voltage reading is being taken the positions of switches 31 and 32 may be reversed. If then the resistance of the voltage circuit of instrument 13 is made the same as that of 12 no resistance calibration will be necessary.

The rectified current method of telemetering as above described is subject to a small error if the wave form of the supply is not sinusoidal. This error however may be compensated for by a transformer ratio adjustment. It is generally desirable therefore to provide the rectifying transformers with facilities for ratio adjustment as indicated.

In the foregoing, I have specified certain types of devices as well as values of current, voltage and resistances by way of describing examples of my invention which I have found to be practicable in existing installations for the measurement of volts and amperes. In the appended claims I seek protection of the invention without confining myself to the particular equipment and values which I may have specified in the explanation.

What I claim as new and desire to secure by Letters Patent of the United States is:

1. A telemetering system comprising a transformer supplied with alternating current, rectifying apparatus supplied by said transformer, a direct current measuring instrument, a circuit connected between the rectifying apparatus and instrument, means for protecting said circuit against voltages in excess of the normal rectified voltages comprising protective means connected across the circuit having characteristics permitting the initial passage of current only when the circuit voltage is in excess of the normal rectified voltages, and a protective resistance connected in said circuit between said protective means and rectifying apparatus.

2. A telemetering system comprising rectifying apparatus, means supplying said apparatus with alternating current, a direct current instrument, a transmitting circuit connected between said instrument and rectifying apparatus, a glow tube connected across said circuit for protecting said circuit against excessive voltages, and a protective resistance connected in said circuit between said glow tube and rectifying apparatus for limiting the current permitted to flow therethrough.

3. A telemetering system comprising rectifying apparatus, means supplying said apparatus with alternating current, a direct current instrument, a transmitting circuit between said rectifying apparatus and instrument, a neon tube and film cut-out connected across said circuit in parallel and adjacent the rectifying apparatus for protecting said circuit from excessive voltages, the neon tube having the lower break-down voltage of the two protective devices which break-down vlotage is in excess of the normal voltage of the circuit, and a protective resistance connected in said circuit between the rectifying apparatus and said two protective devices for limiting the current permitted to flow through said rectifying apparatus.

4. In a telemetering system, a transmitting circuit, transmitting apparatus for supplying telemetering current to said circuit, a voltage protective device, means for connecting said device across and disconnecting it from said circuit, and means for closing and opening said circuit adjacent to the transmitting apparatus, said two means being interlocked so that said circuit is normally open when said protective device is disconnected and normally closed when said device is connected across said circuit.

5. In a telemetering system, a transmitting circuit, transmitting apparatus for supplying telemetering current to said circuit, a socket having terminals connected across said circuit, a glow tube having a base with terminals fitting said socket such that when the tube is inserted into the socket said tube is connected across the circuit for protecting the circuit against excessive voltages, and connections on said base and socket in series relation with said circuit adjacent the transmitting apparatus, which connections are made and broken respectively when said tube is inserted and removed from said socket.

6. A telemetering system comprising a transformer supplied with alternating current, a hot cathode mercury vapor full wave rectifier supplied from the secondary of said transformer, a second transformer for supplying heating current to the cathode of said rectifier, a transmitting circuit supplied from the mid-points of the secondaries of said two transformers, a condenser connected across said circuit for smoothing out the rectified current pulsations, overvoltage protective means connected across said circuit, and a direct current measuring instrument connected to said circuit at a remote point.

7. A telemetering system comprising a transformer supplied with alternating current, a hot cathode, mercury vapor, full wave rectifier supplied from the secondary of said transformer, a second transformer for continuously supplying heating current to the cathode of said rectifier, a transmitting circuit supplied from the mid-points of the secondaries of said two transformers, a condenser connected across said circuit for smoothing out the rectified current pulsations, overvoltage protective means connected across said circuit, a protective resistance in said circuit between the overvoltage protective means and one of said transformers, an adjustable calibrating resistance in said circuit and a direct current measuring instrument connected to said circuit at a remote point.

8. A telemetering system for obtaining a direct current indication corresponding to the flow of current in an alternating current circuit, comprising in combination with such alternating current circuit, a current transformer therein, a rectifying transformer having its primary connected in the secondary circuit of said current transformer, a full wave rectifier connected across the secondary of said rectifying transformer, a protective spark gap connected across the secondary of said rectifying transformer between it and the rectifier, a direct current transmitting circuit supplied by said rectifier and rectifying transformer, a condenser connected across said transmitting circuit, an overvoltage protective device connected across said transmitting circuit, and a direct current measuring instrument calibrated in terms of the current flow in said alternating current circuit connected in said transmitting circuit.

9. A telemetering system comprising a transformer supplied with alternating current, a rectifier supplied by the secondary of said transformer, a transmitting circuit supplied by the rectifier, a direct current measuring instrument connected to said circuit calibrated with the system to indicate a function of the alternating current supplied to the transformer said transformer being adjustable as to its ratio for compensating the system for non-sinusoidial wave form of the alternating current source of supply.

In witness whereof, I have hereunto set my hand this 13th day of November, 1929.

HAROLD B. REX.